US010078831B2

(12) United States Patent
Li et al.

(10) Patent No.: US 10,078,831 B2
(45) Date of Patent: Sep. 18, 2018

(54) CONNECTED TOLL PASS

(71) Applicant: Cellco Partnership, Basking Ridge, NJ (US)

(72) Inventors: Yuk Lun Li, Morganville, NJ (US); Manuel Enrique Caceres, Basking Ridge, NJ (US); Gregory Dial, Flanders, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1345 days.

(21) Appl. No.: 14/079,183

(22) Filed: Nov. 13, 2013

(65) Prior Publication Data
US 2015/0134428 A1 May 14, 2015

(51) Int. Cl.
| | |
|---|---|
| *G06Q 20/32* | (2012.01) |
| *G07B 15/00* | (2011.01) |
| *G07B 15/06* | (2011.01) |
| *H04L 29/08* | (2006.01) |
| *G06Q 20/14* | (2012.01) |
| *H04W 4/80* | (2018.01) |
| *H04W 84/18* | (2009.01) |
| *H04W 4/04* | (2009.01) |

(52) U.S. Cl.
CPC ......... *G06Q 20/327* (2013.01); *G06Q 20/145* (2013.01); *G06Q 20/32* (2013.01); *G06Q 20/3278* (2013.01); *G07B 15/00* (2013.01); *G07B 15/063* (2013.01); *H04L 67/12* (2013.01); *H04W 4/80* (2018.02); *H04W 4/046* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 8,311,559 B1 | 11/2012 | Morrow | |
| 9,836,740 B1 * | 12/2017 | Geist | G06Q 20/3821 |
| 2013/0012123 A1 * | 1/2013 | DeLuca | A45C 13/18 |
| | | | 455/39 |
| 2013/0095757 A1 * | 4/2013 | Abdelsamie | H04W 4/001 |
| | | | 455/41.1 |
| 2013/0110685 A1 | 5/2013 | Dempski | |
| 2013/0157647 A1 | 6/2013 | Kolodziej | |
| 2015/0088617 A1 * | 3/2015 | Geist | G06Q 20/26 |
| | | | 705/13 |
| 2015/0134427 A1 * | 5/2015 | Borras | G06Q 30/0284 |
| | | | 705/13 |

* cited by examiner

*Primary Examiner* — Christle I Marshall

(57) ABSTRACT

Examples are disclosed that facilitate provisioning of a toll system communication device used in an electronic toll collection system, such as EZ Pass. The toll system communication device (e.g., an EZ Pass tag) can have user credentials provided to it that are associated with a user payment account. As a user travels a toll road, the toll system communication device is interrogated at a toll booth location. In response to the interrogation, the toll system communication device provides information identifying the toll system communication device and associated user credentials. The user credentials may be obtained from or authenticated with a mobile device within close proximity to the vehicle equipped with the toll system communication device. Using the user credentials and the identifying information, a user payment account may be provisioned to pay tolls accrued by the vehicle using the toll road.

20 Claims, 7 Drawing Sheets

100

200

300

400

500

600

CONNECTED TOLL PASS

BACKGROUND

In recent years, the adoption of electronic toll collection (ETC) systems has increased, and the systems are used in various countries. The ETC systems allow vehicle users to pay tolls using a toll road. A user may submit a document to establish an ETC account with a respective roadway management authority, such as the Pennsylvania Turnpike Commission. The management authority issues a radio frequency transmitter device (i.e., a toll pass or toll tag) that a user can mount on the windshield of a vehicle identified in the application. At different locations along the toll road, a toll collection location has a transmitter that interrogates the radio frequency transmitter device mounted in the vehicle for the user account. When the vehicle in which the radio frequency transmitter is mounted passes through a toll collection location equipped to communicate with the radio frequency transmitter device, collection of data from the device mounted on the vehicle enable charging of the user's ETC account for the amount of the toll.

A user is assigned a respective radio frequency transmitter device for each vehicle listed in a document requesting issuance of a radio frequency transmitter device. If a user operates different vehicles, such as a rental car, the user is unable to use their ETC account established with the roadway management authority because the radio frequency transmitter device in the rental car is not associated with the user's ETC account. Approximately 22 states within the United States provide ETC systems, however, the same radio frequency transmitter device is not usable in all 22 states. As a result, a user may have to establish multiple ETC accounts and use different devices in order to pay tolls in different states as a user's vehicle travels from one state to another. It would be beneficial to provide a provisionable radio frequency transmitter device to allow a user payment account to be easily and securely reassigned from one radio frequency transmitter device to another.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
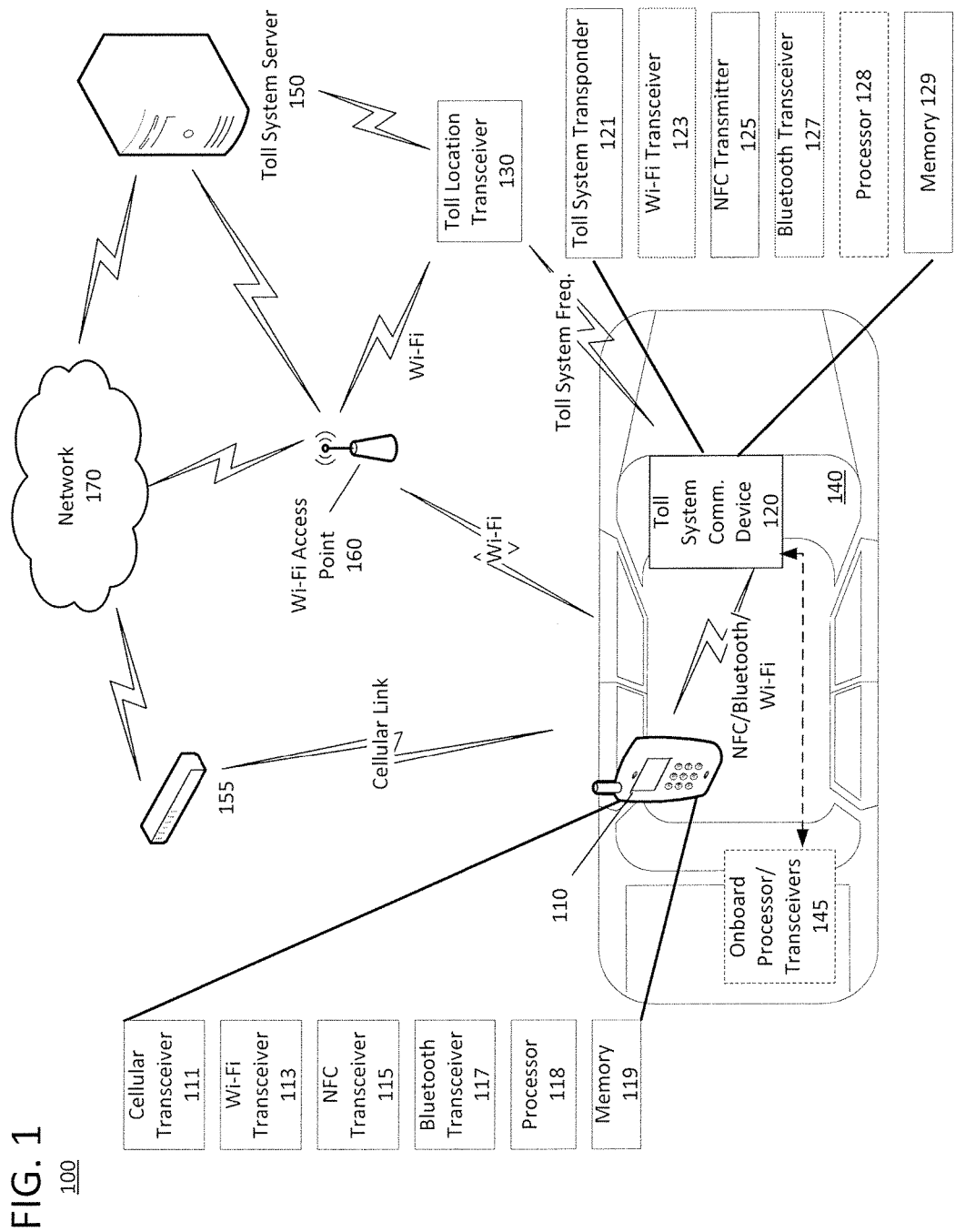
FIG. 1 is a high-level functional block diagram of an example of a system of networks/devices that provide various communications for mobile stations and interactive devices for implementing examples of a toll system communication device provisioning service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate using a mobile device in the provisioning of a toll system communication device with user credentials associated with a user toll payment account.

In several examples described in detail below, a mobile device includes at least one user interface element, a wireless communication transceiver, a near field communication (NFC) transceiver, a storage device and a processor. The processor is coupled to the at least one user interface element, and the wireless communication transceiver and the NFC transceiver, and the processor has access to the storage device. The processor is configured to perform a variety of functions. For example, the processor may be configured to receive and store user credentials that identify a user toll payment account for payment of vehicle tolls. In response to the detection of a toll system communication device via the NFC transceiver, the processor obtains information related to the toll system communication device including information identifying the toll system communication device from the toll system communication device. In these examples, the processor is further configured to transmit a request to associate the user credentials with the toll system communication device. In response to receiving a confirmation of the association of the user credentials with the toll system communication device identifying information, the processor transmits the user credentials to a toll system communication device via the NFC transceiver.

An example of a toll system communication device is also disclosed. The toll system communication device has a wireless toll system communication transponder, a wireless communication transceiver, a processor and a storage device accessible by the processor. The toll system communication device processor is configured to perform various functions. For example, the processor receives user credentials that are associated with a toll payment account via the wireless communication transceiver. The processor stores the received credentials in the storage device. A confirmation signal is transmitted to a toll system server by the processor confirming receipt of the user credentials. The processor responds to receipt of a toll system signal by transmitting via the wireless toll system communication transponder a signal including the stored user credentials and information identifying the toll system communication device.

In another example, a mobile device includes at least one user interface element, a wireless communication transceiver, a processor, and a storage device accessible by the processor. The processor is coupled to the at least one user interface element and the wireless communication transceiver. The processor may be configured to perform a variety of functions. For example, the processor is configured to receive and store user credentials that identify a user toll payment account for payment of vehicle tolls. The processor, via the wireless communication transceiver, can detect the toll system communication device and obtain information related to the toll system communication device that includes information identifying the toll system communication device and user credentials stored in the toll system communication device. Via the at least one user interface element, a prompt may be presented to confirm that the user credentials stored in the toll system communication device are associated with the user toll payment account. The processor, in response to an input to the at least one user interface element, transmits a confirmation of the association of the user credentials with the toll system communication device to a toll system server.

Reference now is made in detail to the examples illustrated in the accompanying drawings and discussed below. FIG. 1 is a high-level functional block diagram of an example of a system of networks/devices that provide various communications for mobile stations and interactive devices, including implementing examples of a toll system communication device provisioning service.

The mobile communication network 100 can be implemented by a number of interconnected networks. For example, a cellular network administered tough cellular network connection 155 may connect to a communication network 170 that may connect to a toll authority system network via toll system network server 150. Alternatively, a number of Wi-Fi access points 160 in the vicinity of a roadway or a parking facility can facilitate the connection of suitably configured mobile devices 110 and other device to the toll system network server 150 through the communication network 170. Communication network 170 may be the Internet, a cellular network, a Wi-Fi hotspot network, a roadway specific network or the like. Similarly, the cellular network connection 155 may connect to a cellular communication network that provides commonly available voice, text and data communications to mobile devices, such as mobile device 110.

The toll system server 150 may be a component in a transit authority's electronic toll collection system. By way of example, such a toll collection system incorporates toll location transceivers 130 along roadways that communicate with individual toll system communication devices 120 located in a vehicle, when the vehicle travels on a roadway subject to toll payments. The toll location transceivers 130 may be located at a number of toll collection locations along the roadway, usually, for example, at a roadway exit or a foot of a bridge. The toll system communication devices 120 are affixed, temporarily or permanently, to a vehicle 140 that may use the toll roadway. For ease of illustration and discussion, only one toll location transceiver 130 and one toll system communication device 120 are shown. A purpose for using the toll system communication device 120 in the electronic toll collection system is to provide a quick, secure and efficient method for a roadway user to pay a toll, or tax, for using a respective roadway. Each of the toll system communication devices 120 is associated with a user payment account that may be maintained by a server, such as toll system server 150, managed by a transit authority or related entity.

Figure 7:
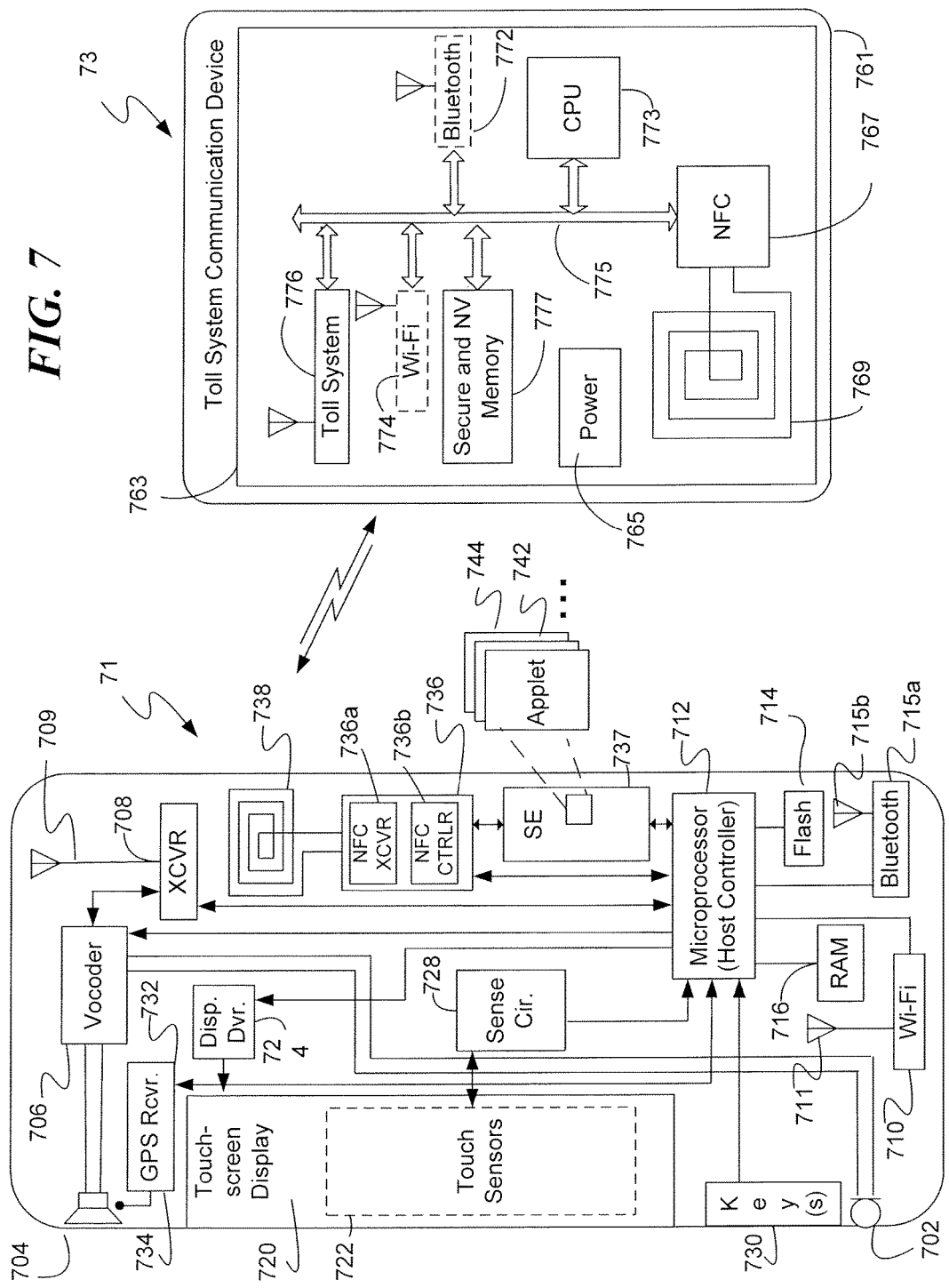
FIG. 7 is a high-level functional block diagram of an exemplary touch screen type mobile station and a toll system communication device that may utilize the toll system communication device provisioning service through a network/system like that shown in FIGS. 1-6.

The toll system communication device 120 may include a number of different components such as those discussed in more detail in respect to FIG. 7. With respect to the example of FIG. 1, the toll system communication device 120 may include a toll system transponder 121, a near field communication (NFC) transmitter 125, and a non-volatile memory 129. Optionally, the toll system communication device 120 may be equipped with one or more of a Bluetooth transceiver 127, a processor 128, and a Wi-Fi transceiver 123. The toll system transponder 121 responds to an interrogation signal in a specific radio frequency, such as 900 MHz, that is generated by the toll location transceiver 130. The response provided by the toll system transponder 121 may include information stored in memory 129, such as user credentials, a toll system communication device 120 identifier, security keys and related security information, an indicator of the capabilities of the toll system communication device 120, and the like.

The toll system server 150 maintains and manages user payment accounts. For example, the toll system server 150 functions include managing user credentials associated the respective payment accounts, maintaining security for the payment accounts, and accounting functions. The toll location transceiver 130 provides the information obtained from the toll system communication device 120 to a toll system server 150. The toll system server 150 or a connected processor uses the obtained information to identify a user payment account to be charged the respective toll amount, perform any other accounting functions, detect any fraud, and/or other related processes. User credentials may include information that identifies the particular owner of the respective user payment account, such as a personal identification number, security keys provided to devices associated with the user payment account, travel limitations and other information related to the user payment account and the user payment account owner.

Depending on the configuration of the toll system communication device 120, other devices, such as mobile device 110 and/or onboard processor and transceivers 145 of vehicle 140, and networks, such as network 170 via Wi-Fi access point 160, can communicate with the toll system communication device 120. The possible system component configurations may allow for communication between the mobile device 110, the onboard processor and transceivers 145, the network 170, the toll system server 150 and the toll communication device 120 to occur with one another through one or more of the NFC transmitter, Bluetooth transceiver or Wi-Fi transceiver. The onboard processor and transceivers 145 and the toll communication device 120 may also be directly connected to one another and may communicate over a wired or optical connection.

The mobile device 110 may include a number of different components such as those discussed in more detail with reference to FIG. 7. With reference to the example of FIG. 1, a mobile device 110 may include at least one user interface element (not shown), a cellular transceiver 111, a Wi-Fi transceiver 113, a NFC transceiver 115, a Bluetooth transceiver 117, a processor 118 and a memory 119. The mobile device 110 may exchange data with the toll system server 150 via one or more of a cellular link through cellular network connection 155 or via Wi-Fi access point 160 and network 170, or directly via Wi-Fi access point 160. In other examples, toll location transceiver 130 may communicate via Wi-Fi access point 160 with mobile device 110 and/or toll system communication device 120.

In another example, the mobile device 110 and the toll system communication device 120 are collocated in the passenger compartment of a vehicle 140. However, the toll system communication device 120 may be removable from the vehicle 140 and the following described processes may occur at locations, such as, for example, at a service counter of a rental car company or of the toll system management authority, or another location outside the vehicle 140. Alternatively, the toll system communication device 120 may be embedded within an area different from the passenger compartment of a vehicle 140, such as an engine compartment, a roof, front bumper or other component of the vehicle 140.

Figure 2:
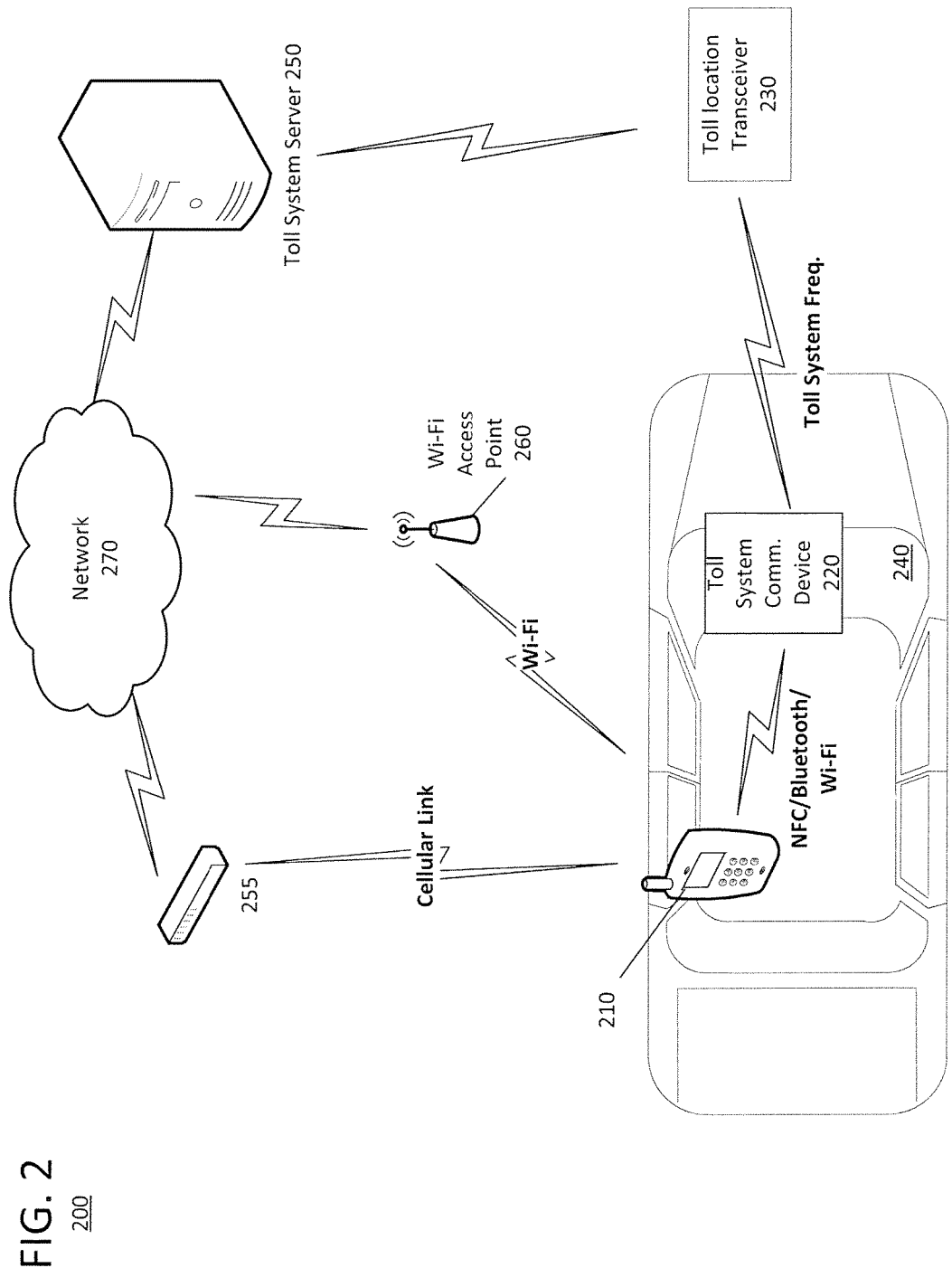
FIG. 2 is a high-level functional block diagram that illustrates an example of a system for provisioning a toll system communication device.

FIG. 2 is a high-level functional block diagram that illustrates an implementation of an example of a toll system communication device provisioning service. In the example illustrated in FIG. 2, the system 200 may include a communication network 270, a cellular network connection 255, a toll system server 250, a Wi-Fi access point 260, a vehicle 240, a toll location transceiver 230, a mobile device 210, and a toll system communication device 220. The communication network 270, the cellular network connection 255, the toll system server 250, and the Wi-Fi access point 260 may all be communicatively coupled to one another as discussed above with respect to FIG. 1. The communication network 270 is accessible to mobile device 210 through either or both of the cellular network connection 255 or the Wi-Fi access point 260, and the toll system server 250 is accessible to the mobile device 210 through the communication network 270. The toll system server 250 is communicatively coupled to the toll location transceiver 230, which communicates with the toll system communication device 220. The disclosed mobile device 210 may include at least one user interface element, a wireless communication transceiver, short range radio-frequency transceiver, such as a near field communication (NFC) transceiver, a storage device and a processor as discussed with reference to FIGS. 1 and 7. The wireless communication transceiver may be a cellular communications transceiver that communicates with the cellular network connection 255. The processor (not shown) of the mobile device 210 may be coupled to the at least one user interface element, the wireless communication transceiver and the NFC transceiver, and may access the storage device. Computer applications executed by the processor may configure the processor to perform a number of functions.

A user toll payment account may be established on the toll system server 250. The user toll payment account may include an account number, a user name, a billing address, credit card information as well as security related information (e.g., account number, user name, a PIN, a passcode, security challenge questions and appropriate responses, other user specific information and the like) that is used to authenticate devices attempting to access a respective user toll payment account. As discussed above, the mobile device 210 may be configured to communicate with the communication network 270 through either or both of the cellular network connection 255 or the Wi-Fi access point 260. The toll system server 250 is configured to communicate with the communication network 270 and to devices, such as mobile device 210 and toll location transceiver 230. The mobile device 210 may access the user toll payment account maintained by the toll system server 250 via the communication network 270. The mobile device 210 can receive from the toll system server 250 user credentials that indicate that the mobile device 210 is provisioned to the user toll payment account represented by the user credentials. The mobile device 210, with the appropriate security measures, such as entering a PIN, may transfer the user credentials to other devices, such as the toll system communication device 220.

Figure 3:
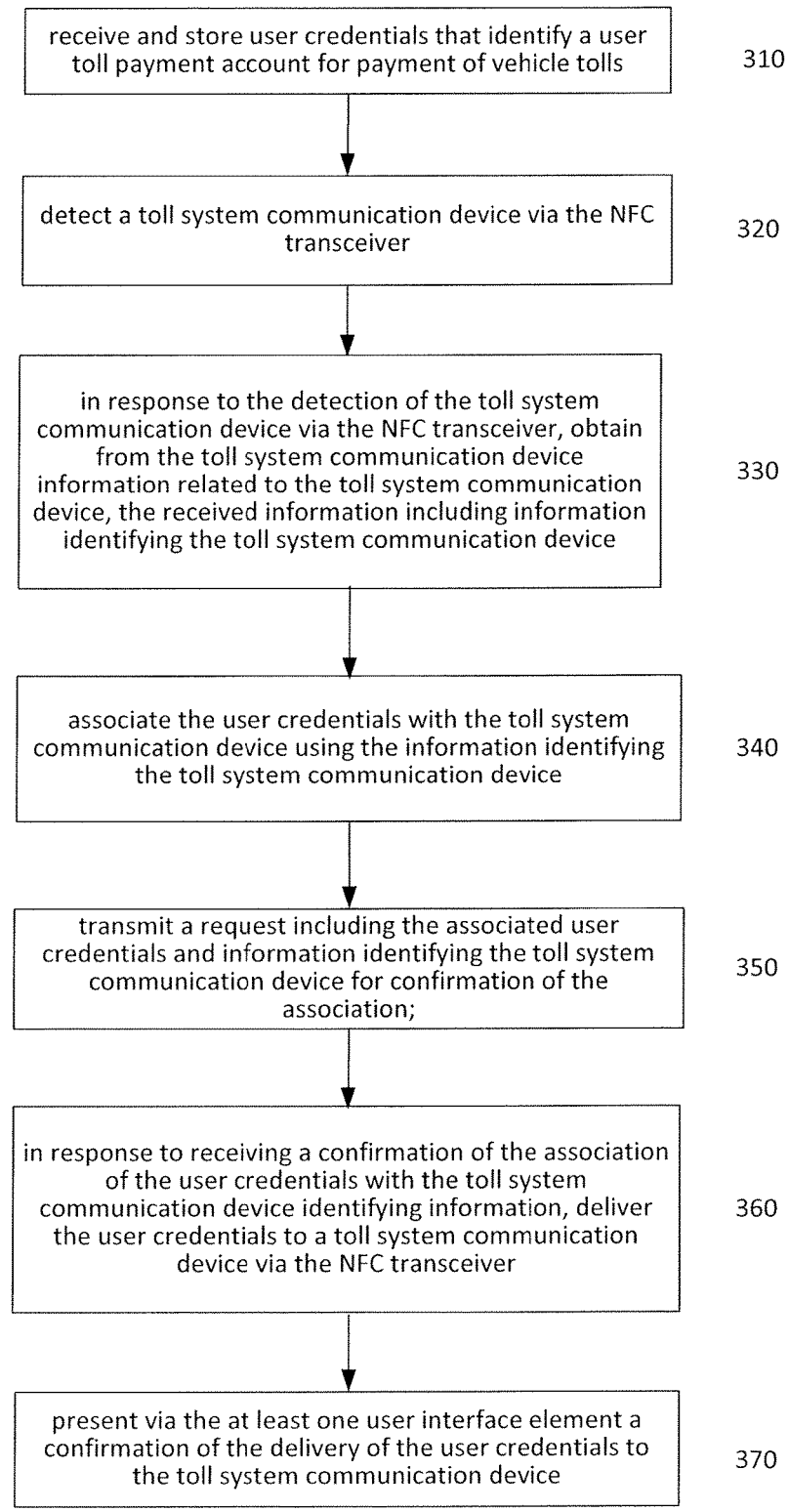
FIG. 3 is a process flowchart of the example of a toll system communication device provisioning service illustrated in FIG. 2.

The functions performed by the mobile device processor will be discussed in more detail with reference to FIG. 3. FIG. 3 is a process flowchart of the example of a toll system communication device provisioning service illustrated in FIG. 2. The processor (not shown) of the mobile device 210 is configured to perform a variety of functions, such as those described with reference to process 300.

For example, the mobile device 210 processor is configured to receive and store user credentials that identify a user toll payment account for payment of vehicle tolls (310). Such credential input may be implemented in any suitable manner. The mobile device 210 processor, in some examples, causes a provisioning application to launch in response to a user input, such as selection of an icon or other input element. Alternatively, the provisioning application may launch in response to an initial reading of data via the short range radio frequency transceiver from the toll system communication device 220. The launched application establishes a communication session with the toll system server 250. For example, the application may cause the presentation of a graphical user interface on at least one user interface element of the mobile device 210. The application may also support different profiles (personal, business, or organizational (e.g. school board)) associated with the mobile device 210. For example, depending upon factors, such as the determined location of the mobile device 210 (e.g. at work or at home), a calendar entry indicating that a business trip is scheduled on the date the application is launched, or the like. The application may also cause the presentation of a group of different user toll payment accounts each having user credentials in, for example, a menu that pertains to the respective profile. In addition, a menu containing the different electronic toll authorities (e.g. one or more of EZ Pass™, Goodtogo™ and Express Toll™) may be presented with a corresponding user account in the user interface from which a user can select. The determination of which electronic toll authority to add to the menu may be determined in part based on a location of the mobile device. In response to an input selecting user accounts, the toll system server 250 may deliver user credentials associated with the selected user account via the communication session with the mobile device. The mobile device 210 is configured to continue the provisioning process using the user credentials selected from the menu of user accounts. For example, the menu may present user toll payment accounts associated with a user profile, such as, personal accounts of a mobile device user, or business (or other organizational) accounts that are related to a business (or organization) profile associated with the mobile device user, or the menu may present a combination of one or more profiles. Alternatively, the mobile device 210 may receive user credentials from a user input to a graphical user interface on at least one user interface element.

The user credentials may include information that identifies the particular owner of the respective user payment account, such as a user name or a personal identification number (PIN), a payment account number, user account associated credit card numbers or bank account numbers, e-mail addresses, mailing addresses, security keys provided to devices associated with the user payment account, travel limitations, identifiers of mobile devices, such as International Mobile Equipment Identity (IMEI) or a Subscriber Identity Module (SIM) identifiers, associated with the user payment account, and other information related to the user payment account and the user payment account owner. The user credential information may be encrypted to provide security.

The processor is further configured to detect a toll system communication device, such as device 220, via short range communication such as using an NFC transceiver within the mobile device 210 (320). In response to the detection of the toll system communication device 220 via the NFC transceiver, the processor obtains information, such as identifying information, related to the toll system communication device 220 from the toll system communication device (330). The toll system communication device-related information is obtained, for example, through the NFC communication session between the mobile device 210 and the toll system communication device 220.

User credentials are associated by the processor with the toll system communication device 220 using the information identifying the toll system communication device 220 (340). The information identifying the toll system communication device 220 may include an identifier of the device, a version number of NFC transmitter and a version number of toll system communication transponder, a name of a toll authority that issued the toll system communication device, memory capacity and the like. The association of the user credentials may occur through a graphical user interface generated by the provisioning application, or automatically in response the data received from the NFC transceiver. For example, upon receipt of the information identifying the toll system communication device 220, the application executing on the mobile device 210 processor automatically generates a request data packet that includes the obtained toll system communication device 220 identifying information and the user credentials (or an indicator thereof). The toll system server 250 uses the data packet to make the association. In an alternative example, the ability to automatically associate the user credentials with the toll system communication device 220 may only be active for a predetermined amount of time, such as ten minutes, after reading the information identifying the toll system communication device 220 or after launch of the provisioning application. Alternatively, the mobile device 210 processor responds to inputs indicating the association of the toll system communication device 220 identifying information with a particular set of user credentials. For example, the application may present a menu of user credentials that may be selected to be associated with the toll system communication device 220 identifying information. The processor is further configured to transmit a request for confirmation of the association of the user credentials with the toll system communication device 220 (350). The transmitted request includes, for example, the associated user credentials and information identifying the toll system communication device 220, but may include more or less information. For example, only the user payment account identifier and a toll system communication device identifier may be included in the request.

The request for account association confirmation may be sent by the mobile device 210 processor via the wireless communication transceiver to a server address associated with the received user credentials. The server address may be to a server such as toll system server 250 shown in FIG. 2. The toll system server 250 may process the request to confirm that the association is acceptable. For example, the toll system server 250 may confirm that the user payment account related to the user credentials has an acceptable account balance, the mobile device 220 is authorized make an association, and the like. The toll system server 250 sends a response either denying or confirming the association of the toll system communication device 220 with the user payment account to the mobile device 210.

In response to receiving a confirmation of the association of the user credentials with the toll system communication device 220 identifying information, the mobile device 210 processor transmits the user credentials to a toll system communication device 220 via the NFC transceiver (360). For example, the mobile device 210 processor via the provisioning application described above may cause a prompt to be presented on the mobile device 210 instructing the user to place the mobile device 210 within NFC communication operating range of the toll system communication device 220 to allow transmission of the user credentials to the toll system communication device 220. Alternatively, the transmission of the user credentials may occur automatically while the mobile device 210 is within NFC communication operating range of the toll system communication device 220. The toll system communication device 220 may provide an acknowledgement that the user credentials have been received; and, in response, the processor may generate a signal to present a response on the mobile device interface element. For example, in the case of a confirmation, the mobile device 210 processor presents via the at least one user interface element a confirmation of the delivery of the user credentials to the toll system communication device 220 (370). The presented confirmation to acknowledge receipt of the user credentials may take various forms. For example, the mobile device 210 presents a message on the mobile device interface element that includes one or more of a confirmation code (e.g., alphanumeric) indicating receipt of the user credentials, an identification code related to the toll system communication device 220, an indication of a time duration that toll system communication device 220 will be provisioned to the respective user credentials, and an account balance associated with the user credentials. In another example, the mobile device 210 may produce a tactile response, such as a vibration, or auditory response, such as a computer generated voice or a distinctive sound.

By the described process 300, the vehicle toll system communication device 220 is provisioned to the user payment account represented by the user credentials. As the vehicle 240 travels along the toll road, it passes toll location transceivers 230 that interrogate the toll system communication device 220. In response to the interrogation signal, the toll system communication device 220 provides the stored user credentials and may provide other vehicle-related information, location-related data or other information to the toll location transceiver 230. The toll location transceiver 230 sends information to the toll system server 250 for processing of a toll payment, if due, with respect to the user account associated with the user credentials.

In some situations, such as when using a rental car or vehicle 240 and the rental period ends, a user may desire to disassociate user credentials from the toll system communication device 220. In that situation, a user may place the mobile device 210 within operating range of the NFC transmitter of the toll system communication device 220 another time subsequent to the time described above. In such a case, the mobile device 210 processor detects the toll system communication device 220 through the NFC transceiver the subsequent time. In response to the detection of the toll system communication device 220 via the mobile device 210 NFC transceiver at the subsequent time, the processor transmits a command via the mobile device 210 NFC transceiver to the toll system communication device 220 to delete the delivered user credentials from the toll system communication device 220. The deletion of the user credentials from the toll system communication device 220 may occur automatically in response to the mobile device 220 being brought within NFC operating range of the toll system communication device 220. Alternatively, the deletion of the delivered user credentials from the toll system communication device 220 may be confirmed by the provisioning application causing the presentation of a confirmation message to the user via the at least one user interface element of the mobile device 210. In yet another alternative, a timer may be activated that will allow the deletion if an input is provided to the at least one user interface element or some other action, such as moving the mobile device into operating range of the NFC transceiver with respect to the toll system communication device 220 within a predetermined time limit.

By way of another example, the system may be configured to ensure that user credentials are not maintained within the memory of a toll system communication device 220 when a mobile device 210 related to the user credentials is no longer collocated within proximity to the toll system communication device 220 for predetermined period of time. For example, the mobile device 210 and the toll system communication device 220 may both be equipped with a Bluetooth transceiver. This alterative communication technology may be useful to ensure that the mobile device 220 remains in proximity to the toll system communication device 220. For example, in some configurations, the mobile device 210 transmits a polling signal to the toll system communication device 220 via the Bluetooth transceiver, and waits to receive a response signal from the toll system communication device 220 via the Bluetooth transceiver. The polling signal may be transmitted, for example, periodically, when the mobile device 210 is turned ON, or during a scheduled term set by the user, such as at the end time of a rental agreement term that is input by a user.

For example, a provisioning application may include options, such as a calendar input, to limit how long, such as two days, two weeks or the like, the user credentials will be associated with the toll system communication device 220. After the end of the scheduled term, the user credentials are deleted from and disassociated with the toll system communication device 220. A response received from the toll system communication device 220 indicates to the mobile device 210 that the toll system communication device 220 is still within the range of the Bluetooth transceiver of the mobile device 210. However, in the absence of a response from the toll system communication device 220 to the polling signal transmitted via Bluetooth, e.g. after some number of consecutive pollings over a time period, the mobile device 210 processor is configured to transmit to the toll system server 250 a request to disassociate the toll system communication device 220 from the user payment account. This disassociation request may be transmitted via the wireless communication transceiver, which may be either a cellular network transceiver or a Wi-Fi transceiver. The mobile device 210 processor may also present a warning message of the impending user credential deletion on the interface element to allow a user an opportunity to confirm or stop the deletion. In an example, the mobile device 210 may present, via the at least one user interface element, a warning message that includes a countdown timer indicating that the impending deletion will happen when the countdown reaches zero. The warning message may or may not be accompanied with an auditory or tactile indicator, such as, for example, a repeating sound or vibration that increase in frequency as the countdown timer approaches zero. Alternatively, the warning message may include a prompt that requests an input into at least one user interface element, such as a touch, an audible input, or a particular movement of the mobile device 210, such as a shake, that may be interpreted by the mobile device processor as a signal to cancel the deletion; otherwise, the deletion will occur. Alternatively, the warning prompt may request a user input as a confirmation that the user wants the deletion to occur.

The warning message functionality may be relevant in a rental car situation. For example, a user may rent a vehicle with the disclosed toll system communication device and not use the vehicle for several days during which time the vehicle will not have responded to the polling signal. Or, when a renter returns the rented vehicle but does not remember to delete their user credentials from the toll system communication device. In the rental examples, in the absence of a response to the polling signal, a warning message, such as one of the prompts discussed above, is presented on the user interface element of the mobile device. If the user intends for the user credentials to be deleted from the toll system communication device 220, a disassociation request is transmitted by the mobile device 210 to the toll system server 250.

In some system configurations, a second communications transceiver, such as a Wi-Fi transceiver, is used for exchanging communications between the mobile device and the toll system communication device. The processor is configured to use the second communications transceiver to establish a communication session between the mobile device and the toll system communication device. The second communications transceiver facilitates communication between the mobile device and the toll system communication device, for example, in situations in which the toll system communication device is located in different locations of a vehicle other than the passenger compartment. Using the second communications transceiver, user credentials can be transmitted to the toll system communication device and information identifying the toll system communication device can be provided to the mobile device.

Figure 4:
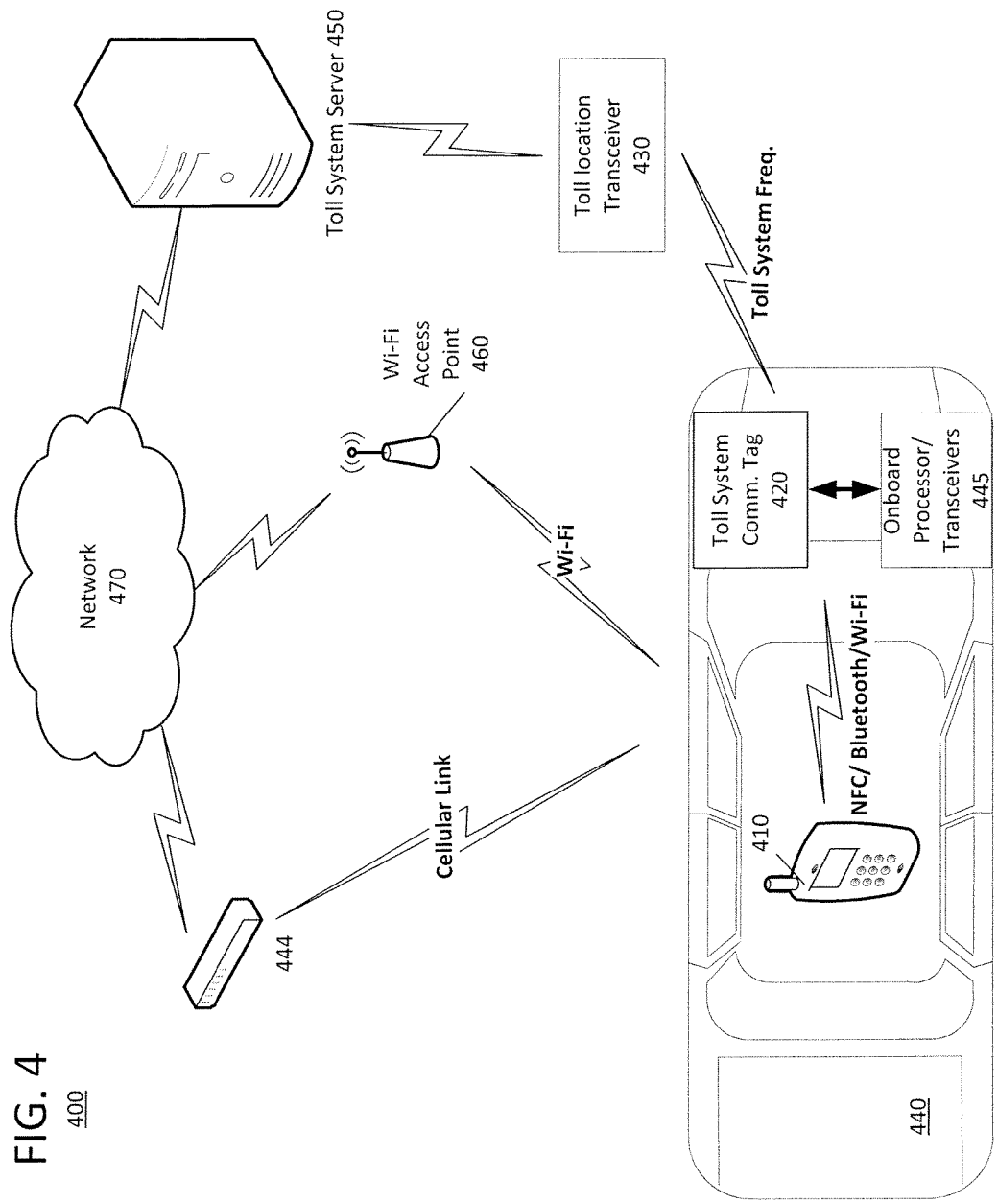
FIG. 4 is a high-level functional block diagram that illustrates an implementation of another example of a toll system communication device provisioning service.

FIG. 4 is a high-level functional block diagram that illustrates another example of a toll system communication device provisioning service.

In the system 400 shown in FIG. 4, the toll system communication device 420 and the mobile device 410 may include a number of components the same as or similar to components shown in FIG. 1. For example, the toll system communication device 420 may include a wireless toll system communication transponder, a wireless communication transceiver, a processor and a storage device. The wireless communication transceiver may be one or more of a cellular network transceiver, a Wi-Fi transceiver, and a Bluetooth transceiver. The mobile device 420 includes features similar to those described in FIG. 1.

The system 400 includes a communication network 470, a cellular network connection 455, a toll system server 450, a Wi-Fi access point 460, a vehicle 440, a toll location transceiver 430, a mobile device 410, and a toll system communication device 420. The communication network 470, the cellular network connection 455, the toll system server 450, and the Wi-Fi access point 460 may all be communicatively coupled to one another as discussed above with respect to FIG. 1. The communication network 470 is accessible to mobile device 410 through either or both of the cellular network connection 455 or Wi-Fi access point 460, and the toll system server 450 is accessible to the mobile device 410 through the communication network 470. The toll system server 450 is communicatively coupled to the toll location transceiver 430, which communicates with the toll system communication device 420 as the vehicle 440 passes a toll location equipped with the toll location transceiver 430.

The vehicle 440 includes an onboard processor and transceiver 445 that is communicatively coupled to the toll system communication device 420 via a wired connection, a wireless connection, or both. In a specific example, the toll system communication device 420 is a universal toll system communication device that is configurable to be usable in a plurality of electronic toll collection systems, such as EZ Pass™, Goodtogo™ or Express Toll™ systems. The onboard processor and transceivers 445 may include a processor that monitors and controls various vehicle systems, such as air bags, engine data, communication with a concierge service, communications with other devices, such as mobile devices, and various transceivers, such as a cellular transceiver, a global positioning system (GPS) receiver, Wi-Fi transceiver, and a Bluetooth transceiver as well as an NFC transponder. From a user's perspective, the unit 445 may be configured as an on-board navigation system and/or telematics unit providing crash detection and reporting services.

In some configurations, the toll system communication device 420 is equipped with a wireless transceiver that allows direct communication with the toll system server 450 via the cellular link with the cellular network connection 455 or the Wi-Fi access point 460. In addition or alternatively, the toll system communication device 420 may be capable of communicating with the mobile device 410 via the toll system communication device 420 Bluetooth transceiver, the Wi-Fi transceiver and the NFC transponder. The mobile device 410 may also communicate with the toll system communication device 420 via the onboard processor and transceivers 445 of the vehicle 440. For example, a toll system communication device 420 can be embedded within an area of a vehicle typically accessible during manufacturing. Such an embedded toll system communication device 420 may be directly connected to the onboard processor and transceivers 445 of the vehicle 440. In which case, the mobile device 410 may communicate through Wi-Fi, Bluetooth or an NFC transponder that is part of the vehicle (e.g., that is located in the vehicle dashboard or mobile device docking station associated with unit 445) with the toll system communication device 420.

Figure 5:
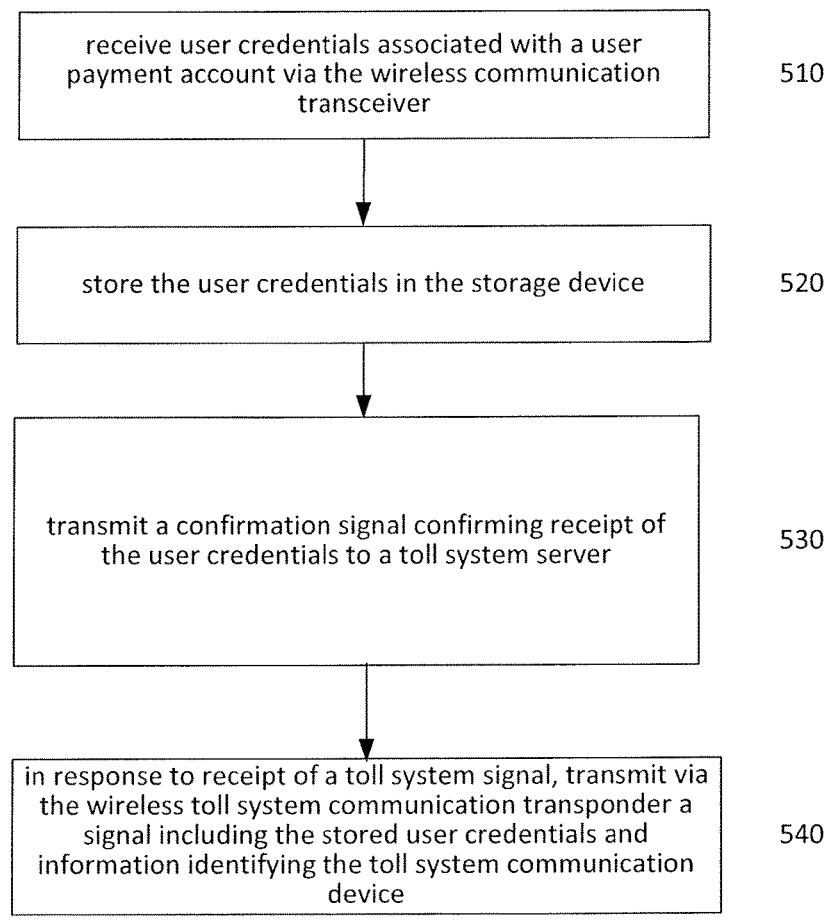
FIG. 5 is a process flowchart of a toll system communication device implementation of the exemplary toll system communication device provisioning service illustrated in FIG. 4.

FIG. 5 is a process flowchart of a process performed by a toll system communication device in an arrangement like that illustrated in FIG. 4. The toll system communication device 420 includes a processor that performs a variety of functions that include a provisioning function illustrated in FIG. 5. The toll system server 450 may provide an application that allows users to create user payment accounts and provide information to fund the payment accounts or other methods of payment of the tolls. The application may be a mobile application for use on a mobile device and/or may be accessible via the Internet from a laptop or personal computer. The application may allow multiple accounts to be generated. For example, there may be multiple different electronic toll systems, such as EZ Pass™, Goodtogo™ or Express Toll™ systems, which utilize different communication protocols, different types of toll system communication devices, and/or operating frequencies. For each type of electronic toll system, the application may facilitate the generation of a group of user credentials that are associated with, for example, a single user may have multiple user toll payment accounts with each account having specific user credentials. In response to a user selection, a specific user credential of a particular user account may be set to be used with a toll system communication device 420. The toll system communication device 420 is configured to accept user credentials input via a short range communication with a mobile device or retrieved from a toll system server via a wireless communication, access the network 470 and the toll system server 450, and be directly through its access to the network 470 and the toll system server 450.

The provisioning process 500 is implemented with a communication device 420 configured to access the network 470 and the toll system server 450. User credentials associated with a user payment account are received by a toll system communication device 420 via a wireless communication transceiver (510). For example, the toll system communication device 420 can be equipped with one or more wireless transceivers, such as a Bluetooth transceiver, a Wi-Fi transceiver, a cellular transceiver accessed through the onboard processor and transceivers 445. Using the wireless transceiver, the user credentials may be transmitted from the toll system server 450 to the toll system communication device 420. In another example, the wireless transceiver is an NFC transponder. In which case, the user credentials are provided by a mobile device 410. The toll system communication device 420 stores the received user credentials in a storage device (i.e., memory) (520). In response to receiving the user credentials, a confirmation signal confirming receipt of the user credentials is transmitted to the toll system server 450 by the toll system communication device 420 (530).

As the vehicle 440 passes by a toll location transceiver 430, such as in a toll lane of the roadway, a toll system signal is transmitted to interrogate the vehicle's toll system communication device 420 for user credentials. In response to receiving the toll system signal, the toll system communication device 420 transmits a signal including the stored user credentials and information identifying the toll system communication device 420 (540) to a toll system server 450 so a toll payment can be made using the respective user account information.

The toll system communication device 420 processor may be further configured to perform additional functions. For example, when the wireless transceiver of the toll system communication device 420 is a Bluetooth transceiver, the toll system communication device 420 and the mobile device 410 are paired to one another. Pairing may be accomplished through completion of a handshaking process in which each device has preliminary information regarding the other device that allows data to be exchanged between the two devices. Pairing may require one or more user steps to confirm and complete the handshaking process. For example, a provisioning application may launch on the mobile device and cause the presentation of a graphical user interface on a user interface element of the mobile device 410. In response to inputs, the mobile device 410 may receive the inputs that facilitate the completion of the handshaking process. The toll system communication device processor is configured to authenticate the paired Bluetooth-enabled mobile device 410 as a device associated with the user credentials stored in the storage device of the toll system communication device 420. The authentication is accomplished, for example, by performing a security key exchange and processing the keys according to a security protocol to confirm the authenticity of the keys and information provided by the Bluetooth-enabled mobile device 410. Continuing the above example, the launched provisioning application may cause the presentation of prompts requesting a user to input security keys or similar authentication information.

In another example, the Bluetooth-enabled mobile device 410 and a toll system communication device 420 have been previously paired and are moved out of Bluetooth range of one another. A provisioning application on the mobile device 410 may launch when the mobile device 410 is moved back into Bluetooth range of the toll system communication device 420. A user may interact via a user interface with the launched provisioning application to select a suitable user account. Alternatively, since the mobile device 410 and the toll system communication device 420 have been paired previously, a suitable user account may be pre-selected by the application and may only require user confirmation.

As a measure of security and to also allow for situations in which different users may use the vehicle 440 equipped with the toll system communication device 420, the toll system communication device processor transmits a polling signal via the Bluetooth transceiver to the paired Bluetooth-enabled mobile device 410 and if a response is received to the polling signal, the toll system communication device processor authenticates that the polling signal response is received from the paired Bluetooth-enabled mobile device 410. Otherwise, when a response is not received the toll system communication device 420 begins a process to delete the stored user credentials from its storage device. In some configurations, the toll system communication device 420 is configured to pair with only one Bluetooth-enabled mobile device 410. In another processor configuration, the toll system communication device processor waits, after the transmission of a polling signal, a predetermined time period to receive a polling signal response from the Bluetooth-enabled mobile device 410. In response to the predetermined time period lapsing, the toll system communication device processor deletes the stored user credentials associated with the paired Bluetooth-enabled mobile device 410 from the storage device. Conversely, if a response is received within the predetermined time period, the polling signal will be retransmitted at another time and the process repeats. The above examples are useful when multiple users of a vehicle 440, such as in a rental car application, may use wish to use the toll system communication device 420. In an example, a provisioning application executing on the mobile device 410 may cause the presentation of a credential deletion warning message, such as a countdown timer, to confirm the deletion of the user credentials from the toll system communication device 420.

As another example of ensuring security, when the wireless communication transceiver of the toll system communication device 420 is a NFC transmitter, the toll system communication device processor may respond to an NFC request received from a mobile device 410 placed within operating range of the NFC transmitter by performing an authentication process for authenticating the requesting mobile device 410 as a device authorized to provision the toll system communication device 420. The authentication may be performed by exchanging, for example, security keys, PIN or other identifiers that are processed by the toll system communication device processor to ensure the requesting device is authorized to receive or deliver user credentials or other user payment account information. In another example, instead of the toll system communication device 420 performing the authentication of the requesting mobile device 410, the toll system communication device 420 may communicate information related to the received NFC request to the toll system server 450 via a wireless transceiver for authentication of the requesting mobile device 410. The authentication process may be similar to the process described above with respect to FIG. 4.

In another example, the toll system communication device 420 may be a universal toll system communication device that when configured can communicate with the various different electronic toll collection systems, such as EZ Pass™, Goodtogo™ or Express Toll™ systems. This capability would be advantageous to long distance travelers, such as truck or bus drivers, as well as tourists. In this example, a processor within the toll system communication device 420 is configured to maintain a location of the toll system communication device 420 as it travels a roadway so the processor can identify when the vehicle 440 will pass from the area served by one type of electronic toll collection system, such as EZ Pass™, and begin traveling in an area served by another system, such as Express Toll™. Since the two systems may operate at different frequencies, have different data formats, and/or use different user credentials, the toll system communication device 420 is capable of reconfiguring different components to accommodate the technical specifications of the respective electronic toll collection system. For example, the toll system communication device 420 may receive GPS data from the onboard processors and transceivers 445 of the vehicle 440 which can be compared to known locations of the respective electronic toll collection (ETC) systems to determine the vehicles position and proximity to the respective ETC systems. In another example, a navigation program executed by the vehicle's onboard processor 445 or a mobile device 410 can deliver position data to the toll system collection device. Alternatively, the processor in the toll system communication device 420 can receive Bluetooth or Wi-Fi signals from, for example, road side beacons or another source, indicating the vehicle position and proximity to the other ETC systems. Using the vehicle position data, the processor 445 can determine when the vehicle 440 will leave a current ETC system, if that is the case, and further determine a next ETC that the vehicle 440 likely will be entering. Based on the determination of the next ETC system, the processor can acquire the ETC system technical specifications from data storage, for example, or by downloading from a network, such as network 470, and can configure the toll system transponder for the respective next ETC. In the example in which the mobile device 410 maintains device location data, the mobile device 410 processor may determine that the vehicle is approaching an ETC system that uses a different standard from the current ETC system. In this case, the mobile device 410 processor may search a memory to determine if the required user account data is available. If the data is available, the provisioning application is launched to allow the user to confirm and/or authenticate the account information. Alternatively, the provisioning application may automatically provision a new user account information if the user had previously selected the necessary options.

For example, the mobile device 410 processor or the toll system communication device 420 processor may also modify the format of user credentials and other required data, when responding to a toll interrogation, to comply with the next ETC data requirements. Alternatively, user credentials usable with the next ETC system may be received by either the mobile device 410 or the toll system communication device 420 from a toll system server of the next ETC system similar to the processes described with respect to FIG. 5 or 6. For example, an authentication of the mobile device 410 similar to that described above may be used to authenticate the mobile device 410 to the next ETC toll system server. Or, the mobile device 410 may have user credentials pre-stored in a storage device that can be used with one or more ETC systems.

Figure 6:
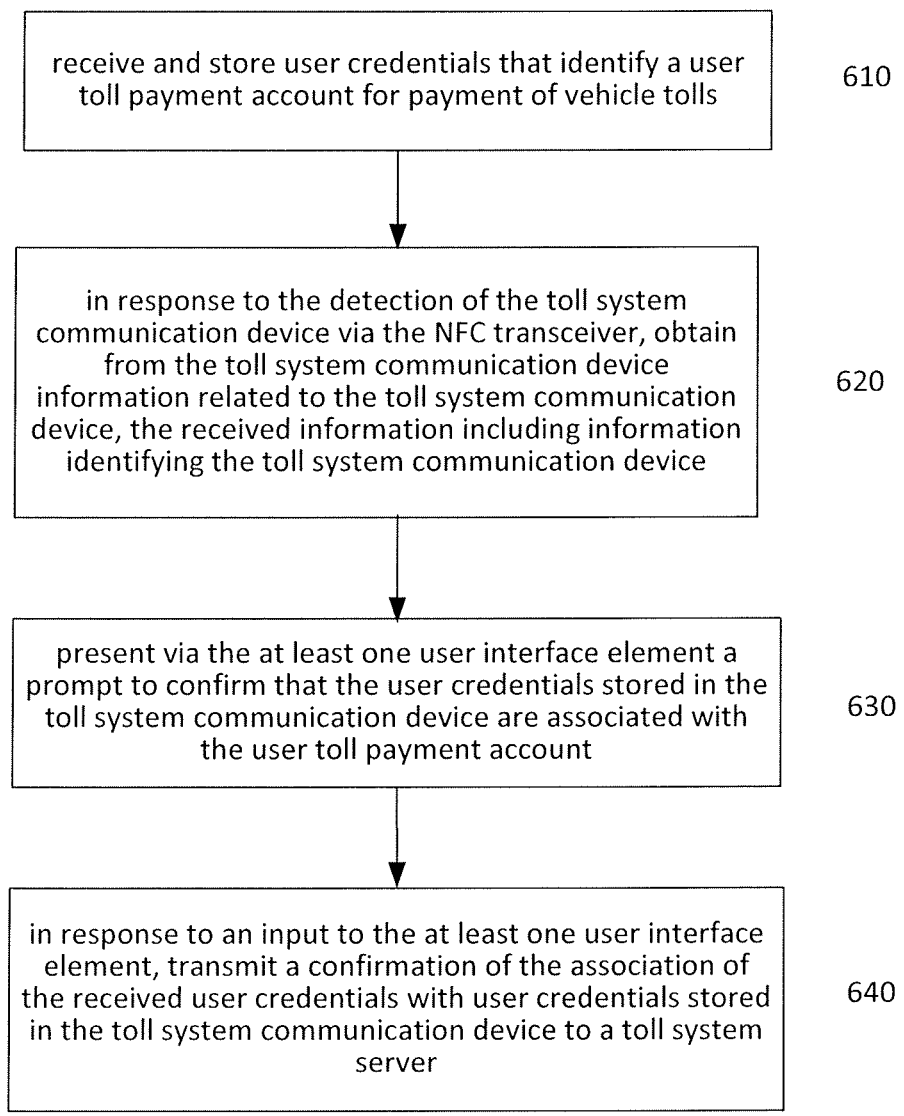
FIG. 6 is a process flowchart of a mobile device implementation of the exemplary toll system communication device provisioning service illustrated in FIG. 4.

FIG. 6 is a process flowchart of a mobile device process of the exemplary toll system communication device provisioning system illustrated in FIG. 4. The mobile device 410 may perform a variety of functions including the process 600 for provisioning a toll system communication device 420. For example, the mobile device 410 is configured to launch and execute an application that facilitates the provisioning of the toll system communication device. A mobile device 410 receives and stores user credentials that identify a user toll payment account for payment of vehicle tolls (610). The user credentials may be received via a cellular, Wi-Fi or Bluetooth transceiver in the mobile device 410. Information may be exchanged between the mobile device 410 and the toll system communication device using various communication methods. For example, a user may choose to use the NFC capabilities of the mobile device 410, and move the mobile device 410 within NFC operating range of an NFC transponder coupled to a toll system communication device 420. In response to the detection of the toll system communication device 420 via an NFC transceiver, the mobile device 410 obtains toll system communication device related information from the toll system communication device 420. The obtained information includes information identifying the toll system communication device and user credentials stored in the toll system communication device (620). The application executing on the mobile device 410 causes a confirmation prompt to be presented on a user interface element of the mobile device 410. The confirmation prompt, for example, requests an input to the user interface element or other component (e.g. microphone or camera) of the mobile device to confirm that the user credentials stored in the toll system communication device 420 are associated with the user toll payment account (630). For example, a user input may be a PIN identifier, a passcode, spoken password, image (e.g. picture of user's face), or some other indicator that mobile device user is associated with user toll payment account. In response to an appropriate user input to the prompt, the mobile device processor transmits a confirmation of the association of the received user credentials with user credentials stored in the toll system communication device to a toll system server 450 (640). This provides a positive confirmation that the user credentials received on the user's mobile device 410 are the same as those stored in the memory of the toll system communication device 420.

The mobile device 410 and the toll system communication device 420 may also be configured to communicate via a Bluetooth protocol. In this configuration, each of the mobile device 410 and the toll system communication device 420 is equipped with a Bluetooth transceiver, such as a Bluetooth low energy transceiver. In this example, the toll system communication device 420 may transmit via Bluetooth a proximity signal to determine if the mobile device is in the proximity of the toll system communication device 420. In response to the proximity signal, the mobile device 410 processor transmits a proximity confirmation signal confirming receipt of the proximity indication signal. The proximity confirmation signal is transmitted in response to receipt of a proximity indication signal received via the Bluetooth communication transceiver from the toll system communication device 420. If, for example, the toll system communication device 420 does not receive the confirmation signal, the toll system communication device 420 will delete the user credentials from its memory.

In some situations, it may be desirable for a user to remove their user credentials from a toll system communication device 420. For example, in the situation of a rental car, a bus driver using a different bus, or the like, a user may place the mobile device 410 within operating range of an NFC transmitter coupled to the toll system communication device 420, for example, an NFC transmitter embedded in a dashboard of a vehicle 440. The mobile device 410 processor is configured to detect the toll system communication device 420 through the NFC transmitter a subsequent time, and in response to the detection of the toll system communication device 420 via the NFC transmitter at the subsequent time, deliver a command via the Bluetooth transceiver to delete the delivered user credentials from the toll system communication device 420. The mobile device 410 receives a confirmation signal via the Bluetooth transceiver in response to the deletion command. The mobile device 410 processor is configured to present a confirmation of the deletion of the delivered user credentials from the toll system communication device 420 via the at least one user interface element.

In an alternative to the previous example of a universal toll system collection device 420, the mobile device 410 may provide the position information of the mobile device traveling in the vehicle toll system communication device 420 so the toll system communication device processor can make the required configuration modifications for entering the next ETC system. The mobile device 410 may further be configured to provide modified user credentials that are acceptable for use in the next ETC system to the toll system communication device 420.

FIG. 7 illustrates a mobile device 71 and an NFC enabled device 73 and a relatively short range wireless communication between the mobile device 71 and an NFC enabled device 73. The NFC enabled device 73 represents a variety of NFC enabled devices related to a toll system communication device, which includes an NFC chipset. The example uses a Near Field Communication (NFC) system in the mobile device 71 to communicate with the NFC enabled device 73, for example, to provide data to or receive information from the NFC enabled device 73. In an exemplary process, the following steps may take place. At a high level, a user brings the NFC enabled mobile device 71 within close proximity (e.g., 2 to 4 cm or less, although in some cases the distance may be up to 20 cm) of the NFC enabled device 73. An application installed on the mobile device 71 responds to NFC events detected by the NFC system (736 and 738) in the mobile device 71, and commences a contactless data flow by establishing communication with the NFC enabled device 73.

In a card emulation mode, the NFC enabled device 73 (e.g., a toll system communication device, such as an EZ Pass tag) generates a magnetic field via its antenna 769 and initiates the exchange of information with the mobile device 71. The magnetic field carries a low-level protocol exchange to perform a transfer of information from the NFC enabled device. The NFC-enabled device 73 is the initiator of the exchange and the mobile device answers to the commands sent by the NFC-enabled device 73. The NFC controller 736*b* forwards data received from the NFC-enabled device 73 to the secure element (SE) 737 for authentication. When the authentication criterion (or criteria) is met, secure information from the SE is released from the SE 737 through the NFC controller 736*b* to the NFC enabled device 73.

In a second mode of operation, such as peer-to-peer (P2P), the mobile device 71 initiates a data exchange with another device (e.g., second NFC-enabled mobile device such as a toll system communication device). Such data exchange is defined in the ISO 18092 standard. In P2P mode, both devices (mobile device 71 and NFC-enabled device 73 in this example) play a symmetric role in that both may generate a magnetic field and transmit and receive data. If a security function is not required, the payload is sent to the host controller 712 for processing. However, if a security function is required due to the nature of the exchange, the payload from the NFC enabled device 73 is evaluated by a rule-set of the security element 737 before routing the information in the payload to the host controller 712. For example, only if the authentication criterion is met by the SE 737 does the NFC controller allow the host controller 712 to process the information from (or provide information to) the NFC-enabled device 73. The authentication and the provisioning of the SE by a remote server is discussed in more detail in a later section.

In a read and/or write mode, the mobile device 71 initiates communication with an NFC-enabled device 73. In this (read and/or write) mode, the mobile device 71 is used to emulate the behavior of a contactless card reader. For example, the mobile device 71 communicates with an NFC-enabled device 73 to access digital content. When a mobile device 71 is brought within range of the smart poster, the NFC controller on the mobile device 71 detects the presence of a contactless tag, generates a magnetic field, which is used to power the contactless tag. Of course, the toll system communication device may also have its own power source. The NFC-enabled device 73 responds with relevant content, such as a URL, SMS text message, etc.

As in the P2P case, in one example, only if the authentication criterion is met by the SE 737 does the NFC controller allow the host controller 712 process the data message (e.g., link to an URL) provided by the NFC-enabled device 73.

The different NFC modes of operation may be implemented via a variety of types of mobile devices having a host controller 712, memory 716 and 714, NFC 736 with a security element 737, and an NFC enabled device 73, which often will also include a processor, memory and an RF (contactless) communication capability. It may be helpful to consider examples of a mobile device 71 and an NFC enabled device 73 in somewhat more detail.

FIG. 7 illustrates elements of the mobile device 71 and elements of the NFC enabled device 73 in functional block diagram form, at a relatively high level. First, we will consider the mobile device 71.

It should be appreciated that the disclosed subject matter may be implemented using any mobile computing device having short range (e.g. NFC) communication capability and mobile communication capability, configured to use those capabilities to conduct mobile transactions, e.g. for purchasing and data exchange, as discussed herein. In the example of FIG. 7, the mobile device 71 is in the form of a smart phone type mobile handset including a touch screen display 720. Examples of touch screen type mobile devices that may be used to implement mobile device 71 may include (but are not limited to) a smart phone, personal digital assistant (PDA), tablet computer or other portable device with NFC capability. However, the structure and operation of the touch screen type mobile device 71 is provided by way of example; and the subject technology as described herein is not intended to be limited thereto. For purposes of this discussion, FIG. 7 provides a block diagram illustration of the exemplary mobile device 71 having a touch screen display for displaying content and receiving user input as (or as part of) the user interface.

Also, as shown in FIG. 7, the mobile device 71 includes at least one digital transceiver (XCVR) 708, for digital wireless communications via a wide area wireless mobile communication network, although the mobile device 71 may include additional digital or analog transceivers (not shown). The transceiver 708 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 708 provides two-way wireless communication of information including digitized audio signals, still image and/or video signals, web page information for display as well as web related inputs, and various types of mobile message communications to/from the mobile device 71.

Several of these types of communications through the transceiver 708 and a network, as discussed later, will relate to provisioning of the SE 737 by a remote server. Toll system related communications involving information obtained from the NFC enabled device 73, for example, often utilize Internet Protocol (IP) packet data transport utilizing the digital wireless transceiver (XCVR) 708 and over the air communications to and from base stations of the serving mobile network. Such communications may include specific toll system account related data and security information from the mobile device 71, as well as payload information received from an NFC enabled device 73 during a particular communication. Accordingly, such wireless transaction data communications may include at least some of the data obtained from the NFC enabled device 73.

In one example, the transceiver 708 also sends and receives a variety of signaling messages in support of various voice and data services provided by a network of a wireless service provider, to a user of mobile device 71 via the mobile communication network. Transceiver 708 connects through radio frequency (RF) send-and-receive amplifiers (not separately shown) to an antenna 709. Transceiver 708 may also support various types of mobile messaging services, such as short message service (SMS), enhanced messaging service (EMS), and/or multimedia messaging service (MMS). Although toll system communications involving user payment account data obtained from the NFC enabled device 73 typically utilize IP data transport, such toll system communications may at times utilize one or more of these mobile messaging services for the data transport through the mobile communication network.

Many modern mobile devices also support wireless local area network communications over Wi-Fi, instead of or in addition to data communications using the wide area mobile communication network. Hence, in the example of FIG. 7, for packet data communications, the exemplary mobile device 71 may also include a Wi-Fi transceiver 710 and associated antenna 711. Although Wi-Fi is used here as the example, the transceiver 710 may take the form of any available two-way wireless local area network transceiver of a type that is compatible with one or more standard protocols of communication implemented in wireless local area networks, such as one of the Wi-Fi standards under IEEE 802.11 and/or WiMAX. The transceiver 710, for example, may provide two-way data transport for wireless communication with a wireless access point in a residence or enterprise that the user frequents or with any available hotspot offered in a public venue. Although communicating through a different network or networks, the transceiver 710 supports various types of data communications similar to the packet data communications supported via the mobile network transceiver 708, including communications related to toll system or user account related communications involving data obtained from the NFC-enabled device 73 and provisioning the secure element 737 with data obtained from a remote server.

The mobile device 71 further includes a microprocessor, sometimes referred to herein as the host processor 712, which serves as a programmable controller for mobile device 71 by configuring mobile device 71 to perform various operations, for example, in accordance with instructions or programming executable by processor 712. For example, such operations may include various general operations of the mobile device 71 as well as operations related to the communication with the NFC-enabled device 73 and conducting related transactions as described herein. A flash memory 714 is used to store, for example, programming or instructions for execution by the processor 712. For example, flash memory 714 stores one or more applications, such as those discussed above, for processing of the user credentials and user payment account information, receiving user inputs and communicating with the toll system communication tag and/or the toll system server, and the like. Depending on the type of device, the mobile device 71 stores and runs an operating system through which specific applications may be run on the device. Examples of operating systems include Android, Apple iOS (I-Phone or iPad devices), Windows Mobile, RIM BlackBerry operating system, or the like. Flash memory 714 may also be used to store mobile configuration settings for different mobile applications or services executable at mobile device 71 (using processor 712). Mobile device 71 may also include a non-volatile random access memory (RAM) 716 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the interaction with the NFC enabled device 73 and related transactions, as described herein. Program aspects of the technology may be thought of as "products" or "articles of manufacture" typically in the form of executable code or process instructions and/or associated data that is stored on or embodied in a type of machine or processor readable medium.

A mobile device supporting read/write, P2P, and card emulation and related transaction communications of the type under consideration here, may include a variety of different types of user interface elements. For discussion purposes, in the smart phone example shown in FIG. 7, the user interface elements of mobile device 71 include a touch screen display 720 (also referred to herein as "touch screen 720" or "display 720"). For output purposes, the touch screen 720 includes a display screen, such as a liquid crystal display (LCD) or the like. For input purposes, touch screen display 720 includes a plurality of touch sensors 722. Other interface elements may include a keypad including one or more keys 730. For example, the keypad may be implemented in hardware as a T9 or QWERTY keyboard of mobile device 71 and keys 730 may correspond to the physical keys of such a keyboard. Alternatively, keys 730 (and keyboard) of mobile device 71 may be implemented as "soft keys" of a virtual keyboard graphically represented in an appropriate arrangement via touch screen display 720. The soft keys presented on the touch screen display 720 may allow the user of mobile device 71 to invoke the same user interface functions as with the physical hardware keys. In some configurations, the microphone 702 and speaker 704 may be used as additional user interface elements, for audio input and output, including with respect to some functions related to the transaction processing and communication, as described herein.

For output, touch screen display 720 is used to present information (e.g., text, video, graphics or other visible content) to the user of mobile device 71. Host processor 712 controls visible display output on the LCD or other display element of the touch screen display 720 via a display driver 724, to present the various visible outputs to the device user. For example, some of the transaction related programming may cause the processor 712 to operate the driver 724 to cause screen 720 to display visible multimedia information about the user payment account, user credentials, the toll system communication device, the toll system, in general, or related services.

In general, touch screen display 720 and touch sensors 722 (and one or more keys 730, if included) are used to provide the textual and graphical user interface for the mobile device 71. In an example, touch screen display 720 provides viewable content to the user at mobile device 71. Touch screen display 720 also enables the user to interact directly with the viewable content provided in the content display area, typically by touching the surface of the screen with a finger or an implement such as a stylus.

As shown in FIG. 7, the mobile device 71 also includes a sense circuit 728 coupled to touch sensors 722 for detecting the occurrence and relative location/position of each touch with respect to a content display area of touch screen display 720. In this example, sense circuit 728 is configured to provide processor 712 with touch-position information based on user input received via touch sensors 722.

The user interface capabilities of the mobile device 71 provide output to and receive input from the user of the mobile device 71, for any of the various functions, operations or applications of the device. For example, programming (discussed more later) that configures the mobile device 71 to obtain and act on information from the NFC enabled device 73 and causes the mobile device to perform a security function may include further acknowledgment requests from the user.

Many implementations of mobile devices today support location based services, which are quite popular now, particularly with smart phone and tablet users. Location information today may be used in a variety of services/applications. There are a variety of ways that a mobile device 71 may be configured to obtain information as to current location of the device. In our example, the mobile device 71 includes a global positioning satellite (GPS) receiver 732 and associated antenna 734. GPS is a space-based satellite navigation system that provides location and time information anywhere on Earth, where there is an unobstructed line of sight to at least three, or more of the GPS satellites.

The mobile device 71 also has NFC communication capability. NFC may be used for a variety of different functions or applications of the mobile device 71. However, for purposes of this discussion, the mobile device 71 interacts with the NFC-enabled device 73 via the NFC communication capability of the mobile device 71. NFC is a set of standards for smart phones and similar devices, such as the exemplary mobile device 71 discussed here, to establish radio communication with other such devices as well as with compatible NFC readers by coming to close proximity (e.g., 4-10 cm or less). Due to its short range and support for encryption, NFC communication is suitable for secure communication over short distances. Each NFC-enabled mobile device or NFC-enabled device includes a transceiver configured to communicate with other NFC capable equipment.

Hence, the exemplary mobile device 71 further includes an NFC sensor. The NFC sensor may be implemented in a variety of ways. In the exemplary mobile device 71 of FIG.

7, the NFC sensor includes an NFC type radio frequency transceiver 736a, which is formed by an NFC chipset 736. The NFC chipset 736 provides two-way wireless communication of information in accordance with NFC technology and protocols. The NFC chipset 736 includes an NFC controller 736b. For simplicity, the NFC 736 is sometimes referred to herein as the NFC controller 736, while it will be understood that it is a controller within the NFC chipset 736. The exemplary NFC sensor also includes an antenna, such as coil antenna 738. The NFC chipset 736 of device 71 connects to the NFC coil antenna 738, for transmitting and receiving NFC communications to/from other NFC compatible devices with compatible transceivers over short air link distances. The transceiver 736a formed by the NFC chipset 736 also sends and receives a variety of signaling messages for establishing NFC links with other NFC-enabled devices and sends and receives various user data over the established NFC links. The signaling, for example, may allow the transceiver formed by the NFC chipset 736 to detect proximity of another NFC capable device, establish an NFC link with the other device, trigger execution of an appropriate application within the mobile device 71 and send and/or receive data for the application as between the mobile device 71 and the other NFC capable device.

In order to run secure applications such as payment, access to data, such as user credentials and user payment account information, routing to an URL site, and the like, there is a Secure Element (SE) 737. In one example, the SE 737 is separate chip that includes tamperproof storage and execution memory and is configured to communicate with an NFC controller 736b (a secure processor). The NFC controller 736b is different from the host processor 712 in that it focuses on enabling secure transactions. The SE 737 contains applications (e.g., applets) that use secure keys running inside the secure processor. For example, there may be at least one applet 742 for processing of the user credentials and user payment account information, receiving user inputs and communicating with the toll system communication tag and/or the toll system server; and at least one applet 743 for processing of different types of communications, such as a read/write or a P2P operation.

For example, the applications that run on the SE typically run on a Javacard operating system. The SE may include various account information, such as account number, user identification, a personal identification number (PIN), or the like for user verification and possibly account balance and/or transaction record information. The SE may be used to decode credentials of NFC enabled devices. In various examples, the secure element may be part of a subscriber identification module (SIM) chip or a separate secure element like a secure digital (SD) memory card used for storing and accessing applications and data in a secure manner.

Although cryptographic elements are not separately shown, the NFC chip 737 is also configured such that transmissions to the NFC enabled, toll system communication device 73 are encrypted. In one example, communications between the SE 737 and the provisioning server may also be encrypted. Accordingly, the secure data storage and encrypted communication provide enhanced security and reduce the likelihood of fraud against a user's payment account or user credentials.

The toll system communication device 73 in the illustrated example includes a power supply module 765, an NFC transmitter 767 and associated coil antenna 769, and one or more memories 777, such as a secure memory and a non-volatile (NV) memory, and a toll system transceiver 776. The toll system communication device 73 includes a processor serving as the central processing unit (CPU) 773 of the chip 763 and a bus system 775. The toll system communication device 73, depending on its configuration, may include a wireless transceiver, such as a Bluetooth transceiver 772 and Wi-Fi transceiver 774. For example, instead of using an onboard power supply, the power module 765 may collect energy at the time of a communication from the RF transmissions from the mobile device 71 via inductive coupling. Power may be obtained via the coil antenna 769 or another inductive coil (not separately shown) in or connected to the chip 763. The power module 765 converts the collected energy to one or more appropriate direct current (DC) voltage levels and distributes the resulting DC power to the other elements on the chip 763, as needed.

The exemplary NFC transceiver 767 connects to the coil antenna 769, for transmitting and receiving RF communications to/from the NFC enabled mobile device 71. Hence, the chipset 736 and NFC transceiver 767 are sufficiently compatible to enable the mobile device 71 to detect and communicate with an NFC enabled device 73. In one example, from the perspective of the card, the NFC enabled mobile device 71 can appear as a reader NFC enabled device. Put differently, the NFC enabled device 73 may act as a tag and the mobile device 71 may act as a reader when in read/write mode of operation.

The memory 777 of the NFC enabled device 73 stores data and/or executable programming for the CPU 773. For example, the memory may store URL information of the toll system server, or, in secure or encrypted memory, user credentials. In one example, the memory 777 may also include a key that is used for security purposes by the SE 737 of the mobile device 71.

The bus 775 supports signaling and transfer of data and/or instructions as between various elements on the chip 763 including the CPU 773, the memory 777 and the NFC transceiver 767. The memory 777 and programming execution by the CPU 773 provide data storage.

At least some aspects of the methods of provisioning a toll system communication device outlined above may be embodied in programming, e.g. for the mobile device, the toll system communication device, and/or the toll system server. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the electronic toll collection system into the computer platform of a user mobile device or a toll system communication device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the toll system communication device provisioning service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer or the like can read programming code and/or data. Many of these forms of computer readable media may be involved in carrying one or more sequences of one or more instructions to a processor for execution.

In summary, the above examples provide systems and methods that couple a mobile device and a toll system communication device (i.e. a toll pass). The coupled devices facilitate the transfer of user credentials related to a user toll payment account for storage in a toll pass memory. A toll pass configured in the above described manner functions as a personalized toll pass while the user credentials are stored in the toll pass memory.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
   at least one user interface element;
   a wireless communication transceiver;
   a short range transceiver; and
   a processor coupled to the at least one user interface element, the wireless communication transceiver and the short range transceiver;
   wherein the processor is configured to cause the mobile device to perform functions, including functions to:
      receive user credentials that identify a user toll payment account for payment of vehicle tolls;
      in response to the detection of a toll system communication device via the short range transceiver, obtain from the toll system communication device information related to the toll system communication device, the obtained information including information identifying the toll system communication device;
      transmit, via the wireless communication transceiver to a server address associated with the received user credentials, a request to associate received user credentials and the information identifying the toll system communication device, wherein the request includes the identifying information of the toll system communication device; and
      in response to receiving a confirmation of the association of the user credentials with the toll system communication device identifying information, transmit the user credentials to the toll system communication device via the short range transceiver.

2. The mobile device of claim 1, wherein the processor is further configured to cause the mobile device to perform functions, including functions to:
in response to detection of the toll system communication device via the short range transceiver at a subsequent time, transmit a command via the short range transceiver to the toll system communication device to delete the delivered user credentials from the toll system communication device.

3. The mobile device of claim 2, wherein the processor is further configured to cause the mobile device to perform functions, including functions to:
prior to transmitting the command to delete the delivered user credentials, confirm the mobile device transmitted the user credentials to the toll system communication device.

4. The mobile device of claim 1, further comprising:
another wireless transceiver coupled to the processor, wherein the processor is further configured to cause the mobile device to perform functions, including a function to:
transmit a polling signal to the toll system communication device via the other wireless transceiver; and
receive a response signal from the toll system communication device via the other wireless transceiver.

5. The mobile device of claim 4, wherein:
the short range transceiver is a near field communication transceiver, and
the other wireless transceiver is a Bluetooth transceiver or a Wi-Fi transceiver.

6. The mobile device of claim 1, further comprising:
another wireless transceiver coupled to the processor, wherein the processor is further configured to cause the mobile device to perform functions, including a function to:
in the absence of a response from the toll system communication device to a polling signal transmitted via another wireless, transmit to the server a request to disassociate the toll system communication device from the user payment account.

7. The mobile device of claim 6, wherein the other wireless transceiver is a Bluetooth transceiver or a Wi-Fi transceiver.

8. A toll system communication device, comprising:
a wireless toll system communication transponder;
a wireless communication transceiver;
a processor; and
a storage device accessible by the processor;
wherein the processor is configured to cause the toll system communication device to perform functions, including functions to:
receive user credentials via the wireless communication transceiver, wherein the user credentials are associated with a toll payment account;
store the user credentials in the storage device;
transmit a confirmation signal confirming receipt of the user credentials to a toll system server; and
in response to receipt of a toll system signal, transmit via the wireless toll system communication transponder a signal including the stored user credentials and information identifying the toll system communication device.

9. The toll system communication device of claim 8, wherein the wireless communication transceiver is a near field communication (NFC) transponder.

10. The toll system communication device of claim 8, wherein the wireless communication transceiver is a Bluetooth transceiver coupled to the processor; and
the processor is further configured to cause the toll system communication device to perform functions, including the function to:
authenticate a Bluetooth-enabled mobile device as a device associated with the user credentials stored in the storage device of the toll system communication device, wherein the Bluetooth-enabled mobile device is paired with the toll system communication device.

11. The toll system communication device of claim 10, wherein the processor is further configured to cause the toll system communication device to perform functions, including the function to:
transmit a polling signal via the Bluetooth transceiver to the paired Bluetooth-enabled mobile device; and
authenticate a polling signal response is received from the paired Bluetooth-enabled mobile device.

12. The toll system communication device of claim 10, wherein the processor is further configured to cause the toll system communication device to perform functions, including the functions to:
wait a predetermined time period to receive a polling signal response from the Bluetooth-enabled mobile device; and
in response to the predetermined time period lapsing, delete the stored user credentials associated with the paired Bluetooth-enabled mobile device from the storage device.

13. The toll system communication device of claim 12, wherein the processor is further configured to cause the toll system communication device to perform functions, including the function to:
prior to deleting the stored user credentials from the storage device, transmit, via the Bluetooth transceiver to the Bluetooth-enabled device, a warning signal that the stored user credentials are to be deleted.

14. The toll system communication device of claim 8, wherein the wireless communication transceiver is a short range radio frequency transceiver; and the processor is further configured to cause the toll system communication device to perform functions, including the function to:
in response to a short range radio frequency request, authenticate a device sending the request as a device authorized to provision the toll system communication device.

15. A mobile device, comprising:
at least one user interface element;
a wireless communication transceiver;
a processor coupled to the at least one user interface element and the wireless communication transceiver; and
a storage device accessible by the processor; and
wherein the processor is configured to cause the mobile device to perform functions, including functions to:
retrieve user credentials that identify a user toll payment account for payment of vehicle tolls;
in response to detecting a toll system communication device via the wireless communication transceiver, obtain from the toll system communication device information related to the toll system communication device, the obtained information including information identifying the toll system communication device and user credentials stored in the toll system communication device;

present via the at least one user interface element a prompt to confirm that the user credentials stored in the toll system communication device are associated with the user toll payment account; and in response to an input to the at least one user interface element, transmit a confirmation of the association of the received user credentials with user credentials stored in the toll system communication device to a toll system server.

16. The mobile device of claim 15, wherein the processor is further configured to cause the mobile device to perform functions, wherein the function to retrieve user credentials includes functions to:

establish a communication session with a toll system server;

access a toll system server database of user payment account information; and obtain, based on security information input into the at least one user interface element, user credential information related to a user payment account information from the database.

17. The mobile device of claim 15, wherein the processor is further configured to cause the mobile device to perform functions, wherein the function to retrieve user credentials includes functions to:

access the storage device; and obtain credential information related to a user payment account information from the storage device.

18. The mobile device of claim 15, wherein the wireless communication transceiver is a short range transceiver, and the processor is further configured to cause the mobile device to perform functions, including a function to:

in response to receipt of a proximity indication signal received via the short range communication transceiver, transmit a proximity confirmation signal to confirm receipt of the proximity indication signal.

19. The mobile device of claim 18, wherein the wireless communication transceiver is a Bluetooth transceiver or a Wi-Fi transceiver.

20. The mobile device of claim 15, wherein the wireless communication transceiver is a short range transceiver, and the processor is further configured to cause the mobile device to perform functions, including functions to:

detect the toll system communication device through the short range transceiver a subsequent time;

in response to the detection of the toll system communication device via the short range transmitter at the subsequent time, deliver a command via the short range transceiver to delete the delivered user credentials from the toll system communication device; and present a confirmation of the deletion of the delivered user credentials from the toll system communication device via the at least one user interface element, wherein the confirmation is received via the short range transceiver.

* * * * *